(12) United States Patent
Zhu et al.

(10) Patent No.: US 9,239,922 B1
(45) Date of Patent: Jan. 19, 2016

(54) DOCUMENT EXPLOIT DETECTION USING BASELINE COMPARISON

(71) Applicants: Xuewen Zhu, Nanjing (CN); Xinfeng Liu, Nanjing (CN); Xuebin Chen, Jiangsu (CN); Qiang Huang, Jiangsu (CN)

(72) Inventors: Xuewen Zhu, Nanjing (CN); Xinfeng Liu, Nanjing (CN); Xuebin Chen, Jiangsu (CN); Qiang Huang, Jiangsu (CN)

(73) Assignee: Trend Micro Inc., Tokyo (JP)

( * ) Notice: Subject to any disclaimer, the term of this patent is extended or adjusted under 35 U.S.C. 154(b) by 0 days.

(21) Appl. No.: 13/794,400

(22) Filed: Mar. 11, 2013

(51) Int. Cl.
*G06F 21/56* (2013.01)
*G06F 21/55* (2013.01)

(52) U.S. Cl.
CPC ............... *G06F 21/56* (2013.01); *G06F 21/55* (2013.01); *G06F 21/564* (2013.01)

(58) Field of Classification Search
CPC ..... G06F 21/56; G06F 21/561; G06F 21/566; G06F 21/55; G06F 21/564
USPC .......................................................... 726/24
See application file for complete search history.

(56) References Cited

U.S. PATENT DOCUMENTS

| | | | | |
|---|---|---|---|---|
| 5,978,917 | A * | 11/1999 | Chi ................................. | 726/22 |
| 8,201,244 | B2 * | 6/2012 | Sun ....................... G06F 21/564 713/165 |
| 8,307,432 | B1 * | 11/2012 | Feng ............................... | 726/22 |
| 2003/0159070 | A1 * | 8/2003 | Mayer et al. .................. | 713/201 |
| 2004/0054917 | A1 * | 3/2004 | Obrecht et al. ............... | 713/200 |
| 2005/0223238 | A1 * | 10/2005 | Schmid et al. ............... | 713/188 |
| 2005/0268338 | A1 * | 12/2005 | Made ............................... | 726/24 |
| 2006/0095971 | A1 * | 5/2006 | Costea et al. .................. | 726/26 |
| 2007/0240215 | A1 * | 10/2007 | Flores et al. .................... | 726/24 |
| 2007/0240217 | A1 * | 10/2007 | Tuvell et al. .................... | 726/24 |
| 2008/0127346 | A1 * | 5/2008 | Oh et al. ......................... | 726/23 |
| 2008/0134333 | A1 * | 6/2008 | Shipp ............................. | 726/23 |
| 2009/0313699 | A1 * | 12/2009 | Jang et al. ....................... | 726/23 |
| 2010/0064369 | A1 * | 3/2010 | Stolfo et al. .................... | 726/24 |
| 2010/0229239 | A1 * | 9/2010 | Rozenberg et al. ............ | 726/24 |
| 2011/0239294 | A1 * | 9/2011 | Kim et al. ....................... | 726/22 |
| 2012/0084859 | A1 * | 4/2012 | Radinsky et al. ............... | 726/23 |
| 2012/0304244 | A1 * | 11/2012 | Xie .......................... G06F 21/00 726/1 |
| 2013/0097706 | A1 * | 4/2013 | Titonis .................... G06F 21/56 726/24 |
| 2013/0160127 | A1 * | 6/2013 | Jeong et al. .................... | 726/24 |

OTHER PUBLICATIONS

Royal et al., PolyUnpack: Automating the Hidden-Code Extraction of Unpack-Executing Malware, Dec. 2006, 22nd Annual Computer Security Applications Conference, pp. 289-300.*

* cited by examiner

*Primary Examiner* — Kenneth Chang
(74) *Attorney, Agent, or Firm* — Beyer Law Group LLP

(57) ABSTRACT

An application document known to include malware (such as a document exploit) is opened and executed by its corresponding software application. Behaviors of this document (such as registry, file system, network and process) are monitored and recorded using internal software drivers and hook modules. A behavior report is generated and a baseline pattern is created including a number of regular expressions. A suspicious document of the same type as the monitored document is opened and executed by the same corresponding software application. Behaviors are monitored in the same way and a behavior report is generated. This behavior report is compared to the baseline pattern and a determination is made as to whether a document exploit is present. Known benign documents may also be opened, monitored and their behavior recorded, resulting in creation of a known benign pattern for the corresponding software application.

28 Claims, 8 Drawing Sheets

Exploit Detection System

Exploit Detection System

```xml
- <SandcastleLog version="2.2.0000" vsapi="9.562-1039" file="556"
filetype="VSDT_PDF_1_4" logpath="%WorkingDir%\Log\api.log" begintime="2013-02-28
01:21:18.828" endtime="2013-02-28 01:23:16.265" supported="Yes"
Decision="UNDECIDED">
 - <call_tree>
  - <process_call idx="1" pid="1344" filename=""%ProgramFiles%\Adobe\Reader 8.0\Reader\
  AcroRd32.exe" "%Virus%\556.pdf"" startreason="AnalysisTarget" starttime="00:01.906"
  terminationreason="Normal">
   - <call_tree>
     <process_call idx="2" pid="192" filename=""%ProgramFiles%\Adobe\Acrobat 7.0\Reader\
     AcroRd32.exe" "%Virus%\556.pdf"" startreason="CreateProcess" starttime="00:41.547"
     terminationreason="Normal" />
    </call_tree>
  </process_call>
  </call_tree>
 - <processes>
  - <process idx="1" pid="1344" filename=""%ProgramFiles%\Adobe\Reader 8.0\Reader\
  AcroRd32.exe" "%Virus%\556.pdf"" md5="1a5b4b58dbb626776920260704fd0116"
  - <section name="registry">
    <add_key timestamp="00:17.859" key="HKEY_LOCAL_MACHINE\SYSTEM\
    WSZXSGANXFJVAYSXYQGNXKQY\" type="REG_NONE" value="" />
   </section>
  - <section name="file">
    <delete_file timestamp="00:04.281" path="%TEMP%\Acr6CEA.tmp"
    type="VSDT_ERROR" />
    <add_file timestamp="00:06.312" path="%TEMP%\Acr6CEB.tmp" type="VSDT_PDF_1" />
    <write_file timestamp="00:17.859" path="%APPDATA%\Adobe\Acrobat\8.0\Updater\
    updater.log" type="VSDT_ERROR" />
   </section>
  - <section name="filesystem">
    <call_api timestamp="00:02.140" api="FindNextFileW" args="(16e868, 12de50)" ret="1" />
   </section>
  - <section name="system">
    <call_api timestamp="00:01.937" api="IsDebuggerPresent" args="()" ret="0" />
   </section>
  - <section name="mutex">
    <call_api timestamp="01:19.218" api="CreateMutexW" args="( 0, 0,
    2AC1A572DB6944B0A65C38C4140AF2F42440655310C )" ret="e4"
    mutexname="2AC1A572DB6944B0A65C38C4140AF2F42440655310C" />
   </section>
  - <section name="window">
    <call_api timestamp="00:02.047" api="CreateWindowExW" args="( 0, 1865d20, , 0, 0, 0, 64,
    64, 0, 0, 1240000, 0 )" ret="400ec" windowname="" style="0" xpos="0" ypos="0" width="64"
    height="64" />
   </section>  </process>  </processes>  </SandcastleLog>
```

*FIG. 4*
Normal Behavior Report

```
                                                                                510
 _<SandcastleLog version="2.2.0000" vsapi="9.562-1039" file="bsrXjEjwnITyqXTiKXlUse.PDF"
     filetype="VSDT_PDF _1" \ogpath="% WorkingDir%\Log\api.log" begintime="2013-02-28
     01: 18:33.406" endtime="2013-02-28 01 :20:37.531" supported="Yes" Decision="Malicious">
 -<process_call idx="1" pid="1740" filename=""%ProgramFiles%\Adobe\Reader
     8.0\Reader\AcroRd32.exe" "%Virus%\rXjEjwnITyqXTiKXlUse_pDF.pdf"
     startreason="AnalysisTarget" starttime="00:04.078" terminationreason="Normal">
   <process_call idx="2" pid="1056" filename="" %ProgramFiles%\Adobe\Acrobat 7.0\Reader\
     AcroRd32.exe" "%Virus%\bSrXjEjwnITyqXTiKXlUse-pDF.pdf"
     startreason="CreateProcess" starttime="00:47.437" terminationreason="Normal" />
 -<process_call idx="3" pid="876" filename=""%ProgramFiles%\Adobe\Reader
     9.0\Reader\AcroRd32.exe" "%Virus%\bSrXjEjwnITyqXTiKXlUse-PDF.pdf"
     startreason="CreateProcess" starttime="01 :24.359" terminationreason="Normal">
   <process_call idx="4" pid="1040" filename=""C:\DOCUME~1\ADMINI~1\LOCALS~1\Temp\~.
     exe"" startreason="CreateProcess" starttime="01 :36.640" terminationreason="Normal" />
   <process_call idx="5" pid="1220" filename="" %ProgramFiles%\Adobe\Reader 9.0\Reader\
     AcroRd32.exe" "C:\DOCUME~1\ADMINI~1\LOCALS~1\Temp\
     bSrXjEjwnITyqXTiKXlUse_pDF.pdf"
     startreason="CreateProcess" starttime="01 :38.047" terminationreason="Normal" />
 -<processes>        530
                                                                                520
 -<process idx="3" pid="876" filename=""%ProgramFiles%\Adobe\Reader
     9.0\Reader\AcroRd32.exe" "%Virus%\bSrXjEjwnITyqXTiKXlUse-pDF.pdf':
 -<section name="registry">       534
   <""write_key timestamp="01:28.187" key="HKEY_CLASSES_ROOT\TypeLib\{1EA4DBF0-
     3C3B11CF-810C-00AA00389B71 }\l.1\0\win32\(Default)" type="REG _SZ"
     value="oleacc.dll"
     oldvalue="oleacc.dll" />
 -<section name="file">      536
   <add_file timestamp="01:31.750" path="%TEMP%\A9RAEF0.tmp" type="VSDT_PDF_1" />
 -<section name="filesystem">      538
   <call_api timestamp="01:24.594" api="FindNextFileW" args="(165e30, 12ege8)" ret="1" /> .
   <section name="system">      540
   <call_api timestamp="01 :24.390" api="IsDebuggerPresent" args="()" ret="0" />
 -<section name="mutex">      542
   <call_api timestamp="01:28.062" api="CreateMutexW" args="(0, 0, oleacc-msaa-loaded )"
     ret="244" mutexname="oleacc-msaa-loaded" />
 -<section name="process">      544
     <call_api timestamp="01:36.640" api="CreateProcessW" args="( C:\DOCUME~1\
     ADMINI~1\LOCALS~1\Temp\~.exe, "C:\DOCUME~1\ADMINI~1\LOCALS~1\Temp\
     ~.exe",,,,,, %Virus%,, 1040)" ret="1" name="C:\DOCUME~1\ADMINI~1\LOCALS~1\
     Temp\~.exe" cmdline=""C:\DOCUME~1\ADMINI~1\LOCALS~1\Temp\~.exe""
     dir="%Virus%" pid="1040"
 -<section name="service">      546
   <call_api timestamp="01:35.765" api="OpenServiceW" args="( 1accc0, CryptSvc, 5)"
     ret="1acbf8" servicename="CryptSvc" />
 -<section name="network">      548
   <call_api timestamp="01:36.953" api="socket" args="( 23, 2, 0)" ret="3df83" type="2"
     protocol="0"
```

FIG. 5

Malicious Behavior Report

RegExp = (\d{17})\s+\d+ \d{2}\.\d{2}: dumper: \d{3} REG:A (KEY: \[(.+)\\([^\\]+)\]; DATA: \[(.*)\]; TYPE: \[(.+)\]);(\d+)?[\r\n]

RegExp =(\d{ 17})\s+\d+ \d{2}.\d{2}: dumper: \d{3} REG:M (KEY: \[(.+)\\([^\\]+)\]; DATA: \[(.*)\]; TYPE: \[(.+)\]; \(Before: DATA: \[((?!\5).)\]; TYPE: \[(.*)\]));(\d+)?[\r\n]

RegExp = (\d{17})\s+\d+ \d{2}\.\d{2}: dumper: \d{3} FILE:A (.+ )\n(\d*),(\w*),((?!a9ed0067)[a-f\d]{0,}),([a-f\d] {0,} ),([a-f\d] {0,} )[\r\n]

RegExp = (\d{17})\s+\d+ \d{2} \.\d{2}: dumper: \d{3} FILE:M (.+)\n(\d*),(\w*),([a-f\d]+),([a-f\d]+),((?!CD0C14DD71819607831925EF354C2CF2F10E7204)[a-f\d]+) [\r\n]

RegExp =\d{17}\s+\d+ \d{2} \.\d{2}: tracer: \d{3} .+ =CreateMutexW\( [a-f\d]+, \d+, ((?!(RasPbFile|GlobalCsMutex|FAKE_EXPLORER_MUTEX|Add_Hooked_Process_Mutex|DUMP_STRING_EVENT)).+) \)[\r\n]

RegExp =\d{17}\s+\d+ \d{2}\.\d{2}: tracer: \d{3} .+ = MessageBox(A|W|ExA|ExW)\(, (?!\"C:\\windows\\explorer.exe -d )\"([\s\S]+)\", \"(.*)\", \d+ \)[\r\n]

RegExp =\d{ 17} \s+\d+ \d{2}\.\d{2}: tracer: \d{3} .+ =CreateMailslot[AW]\( (.+\\mailslot\\.+), .+, .+, .+ \)[\r\n]

RegExp= \d{17} \s+\d+ \d{2}\.\d{2}: tracer: \d{3} . + =CreateEvent[AW]\( .*,.*,.*, (.*) \)[\r\n]

RegExp =\d{ 17}\s+\d+ \d{2}\.\d{2}: tracer: \d{3}.+ = (CreateProcess[AW]\( (.*?). (?!\"C:\\SandCastle\\tools\\.+|drwtsn32-p|\"C:\\windows\\explorer\.exe -d C:\\virus\\)(.+?), , , , , ,.+)\)[\r\n]

*FIG. 6*

Normal Pattern

RegExp = \d{17}\s+\d+ \d0\.\d{2}: dumper: \d{3} FILE:A ((?!.*?\\Adobe\\Acrobat\\\w+\.\w+\\Cache\\).*)\n(\d*),(VSDT_(EXE|DLL|ELF|VXD).*),(\w*),(\w*),((?!CD0C14DD71819607831925EF354C2CF2F10E7204)\w*)[\r\n] — 704

RegExp = \d{17}\s+\d+ 82\.\d{2}: tracer: \d{3} The command is not executable. \[(.+)\]\[(.+)\]\n — 708

RegExp = \d{17}\s+\d+ 82\.\d{2}: tracer: \d{3} .+ = URLDownloadToFileW\( , URL:(.*), FileName:((.*?)\.(exe|dll|sys)), , \)[\r\n] — 712

RegExp = (\d{17})\s+(\d+) 82\.\d{2}: tracer: \d{3} .+ = connect\( ([a-f\d]+), ((?!.*(\.(adobe|live|yahoo|google)\.com)|127\.0\.0\.1:|localhost:|:443).*?)[\w\.:]+), \d+ \)[\r\n] — 716

RegExp = \d{17}\s+\2 82\.\d{2}: tracer: \d{3} .+ = send\( \3, (?!.*((Host: .*(adobe|verisign|windowsupdate).com)|GET /wpad.dat).*)([^\r\n]+), \d+, \d+ \)[\r\n]

RegExp = \d{17}\s+\d+ \d2\.\d{2}: tracer: \d{3} ([\da-f]+) = InternetConnect[AW]\( .*?, ((?!.*\.(adobe|live|yahoo|google)\.com)|127\.0\.0\.1|localhost).*?), ([\da-f]*), [-\d]*, [-\d]*, ([-\d]*), [-\d]*, [-\d]* \)[\n\r] — 720

RegExp = \d{17}\s+\d+ \d2\.\d{2}: tracer: \d{3} ([\da-f]+) = HttpOpenRequest[AW]\( \1, .*?, (.*?), .*?, .*?, [-\d]*, [-\d]* \)[\n\r]

RegExp = \d{17}\s+(\d+) \d{2}\.\d{2}: tracer: \d{3} .+ = (WriteProcessMemory)\( Process Name:((?!\1)\d+):((svchost|winlogon|smss|lsass|iexplore|explorer|wininit|lsm)\.exe), .*, (MZ.*), \d+, [\S]+\)[\r\n] — 724

RegExp = \d{17}\s+\d+ \d{2|3}\.\d{2}: tracer: \d{3} Process Crash (\.)+(.*)[\n\r] — 728

RegExp = \d{17}\s+\d+ 92\.\d{2}: dumper: \d{3} Heap spray detect, process\[(\d+)\] use \d+M bytes memory\.[\r\n] — 732

RegExp = \d{17}\s+\d+ 92\.\d{2}: dumper: \d{3} Large size\(>= \d+\) of NOP sled has been detected, process\[(\d+)\]\.[\r\n] — 736

*FIG. 7*

Malicious Pattern

DOCUMENT EXPLOIT DETECTION USING BASELINE COMPARISON

FIELD OF THE INVENTION

The present invention relates generally to detection of malware on a computer. More specifically, the present invention relates to detection of document exploits using baseline behavior.

BACKGROUND OF THE INVENTION

Attacks upon computer systems are increasingly becoming more sophisticated and targeted. One particular type of threat, known as an advanced persistent threat (APT), refers to targeted attacks that aggressively pursue and compromise chosen targets, and is commonly associated with a government or other group that has the resources to maintain such an attack. Often, such a long-term pattern of attacks is aimed at other governments, companies, and political activists. Individuals (such as individual hackers) are usually not referred to as being an advanced persistent threat because they rarely have the resources to launch a sophisticated attack or be persistent.

An advanced persistent threat is characterized by: targeting a specific organization or individual; gaining a foothold; accessing the target network; deploying additional tools; and covering tracks in order to maintain future access. One common method of attack, and usually the first vector of an advanced persistent threat, is to exploit a vulnerability in an application program, typically through one of its documents, in order to cause harm. The vulnerability may be some type of flaw, error or poor coding technique in the application program that allows the attacker to exploit the program for a malicious purpose.

This so-called "document exploit" can affect many types of software applications and their corresponding documents. For example, standard computer document types such as Flash files, PDF files, Word documents, Excel documents, PowerPoint documents, RTF files, etc., can be exploited because of flaws in their corresponding application programs. For example, one family of malware modifies PDF files in order to exploit vulnerabilities in Adobe Acrobat and Adobe Reader by executing JavaScript code when the file is opened. The embedded JavaScript may contain malicious instructions to download and install other malware. A computer may become infected when the user visits a compromised Web site or opens the malicious PDF file. This family may exploit over a dozen known vulnerabilities.

Even lesser-known software applications can be the subject of a document exploit, such as the Korean proprietary word processing application Hangul and its HWP file types. Even file types that users would not normally create and that would seem above suspicion are at risk. For example, the help files (extension ".HLP") in the Microsoft operating system are being used in targeted attacks because malware authors can use these files to call an operating system API for a malicious purpose.

A database of common vulnerabilities and exposures (the CVE database) keeps track of publicly known vulnerabilities using unique, common identifiers. For example, two of the most common vulnerabilities exploited by malware in Microsoft Word are CVE-2010-3333 and CVE-2012-0158. Not surprisingly, the methods used to exploit a Microsoft Word document (for example) will differ based upon the particular vulnerability chosen by a malicious program. Often, the payload delivered by the malware falls into particular categories such as launching another malicious process, crashing the computer, downloading another malicious file from the Web, or dropping a file from the original malware.

In addition to the vulnerabilities shown in the CVE database, many of the attacking methods used by a document exploit are well-known such as the stack-based buffer overflow attack, the heap spray attack, use of shell code, or invoking an unsafe method. Accordingly, and unfortunately, most if not all of the prior art detection techniques are based upon the known CVE database or based upon the known attacking methods. For example, static techniques based upon virus signatures only work for known document exploits; these techniques will not work for unknown exploits for which no signature yet exists. Emulation-based techniques have associated overhead, rarely open certain types of files, and often cannot monitor the real behavior of a document because of the emulation.

Other techniques such as private memory usage monitoring, NOP sled detection, string detection and null page allocation often are not helpful because they all attempt to detect the exploit known as "Heap Spray." If no heap spray technique is used in the document, these techniques will not be helpful. And, protection techniques such as ASLR and DEP are not able to stop well-constructed exploits. For example, exploit techniques such as "Return Oriented Programming" and "Information Leak" are ways to bypass both of these protection techniques. Finally, the above detection techniques can be unsuccessful or at best, inefficient, in the case of a zero-day attack.

Accordingly, a new method to detect document exploits that is more efficient, that does not adversely impact system performance, and that is effective in the case of the zero-day attack is desirable.

SUMMARY OF THE INVENTION

To achieve the foregoing, and in accordance with the purpose of the present invention, a document exploit detection technique is disclosed that is able to detect unknown exploits such as zero-day attacks, does not rely upon static signatures, and has none of the overhead of emulation.

In a first embodiment, a pattern is created for detecting a document exploit. A document file known to include a document exploit is executed within its corresponding software application and its behaviors are monitored and recorded while a document file is opened and executes for a predetermined amount of time. Monitoring uses software hooks or internal drivers. Relevant information from the resulting behavior report is extracted in order to create a pattern file used to detect a document exploit. The pattern file may include regular expressions, text strings or another format. A document file known to be free of malware may also be monitored while it is opened in order to create a behavior report and resulting pattern file indicative of malware not being present.

In a second embodiment, a method of detecting a document exploit opens a suspicious document file in a software application corresponding to a particular malicious pattern that has already been created. The suspicious document file actually does not contain any malware. Behaviors of the suspicious document are monitored and recorded in a report file. The behaviors in the report file are compared to the malicious pattern, and weight values are assigned to behaviors in the report file that match with expressions in the malicious pattern. When the threshold is not reached, then an output indicates that the suspicious document file does not contain a document exploit. The report file may also be compared to a benign pattern that corresponds to a normal document free of malware.

In a third embodiment, a method of detecting a document exploit opens a suspicious document file in a software application corresponding to a particular malicious pattern that has already been created. The suspicious document file does contain malware. Behaviors of the suspicious document are monitored and recorded in a report file. The behaviors in the report file are compared to the malicious pattern, and weight values are assigned to behaviors in the report file that match with expressions in the malicious pattern. When the threshold is reached, then an output indicates that the suspicious document file does contain a document exploit.

BRIEF DESCRIPTION OF THE DRAWINGS

The invention, together with further advantages thereof, may best be understood by reference to the following description taken in conjunction with the accompanying drawings in which:

FIG. 4 shows a behavior report for a normal document.

FIG. 5 shows a behavior report for a document deemed to be malicious.

FIG. 6 shows a normal pattern created from a normal behavior report.

FIG. 7 shows a malicious pattern created from a malicious behavior report.

DETAILED DESCRIPTION OF THE INVENTION

In order to detect known or unknown document exploits, the present invention is able to record the baseline behavior of both known normal and known malicious documents being opened and executing within a corresponding software application. Both the normal and the malicious behavior can be extracted into baseline patterns which may then be compared to the behavior of a suspicious document that is opened and executes within the same corresponding software application. If any abnormalities are detected, then an alert may be raised that a document exploit has been detected.

Computer System Block Diagram

Figure 1:
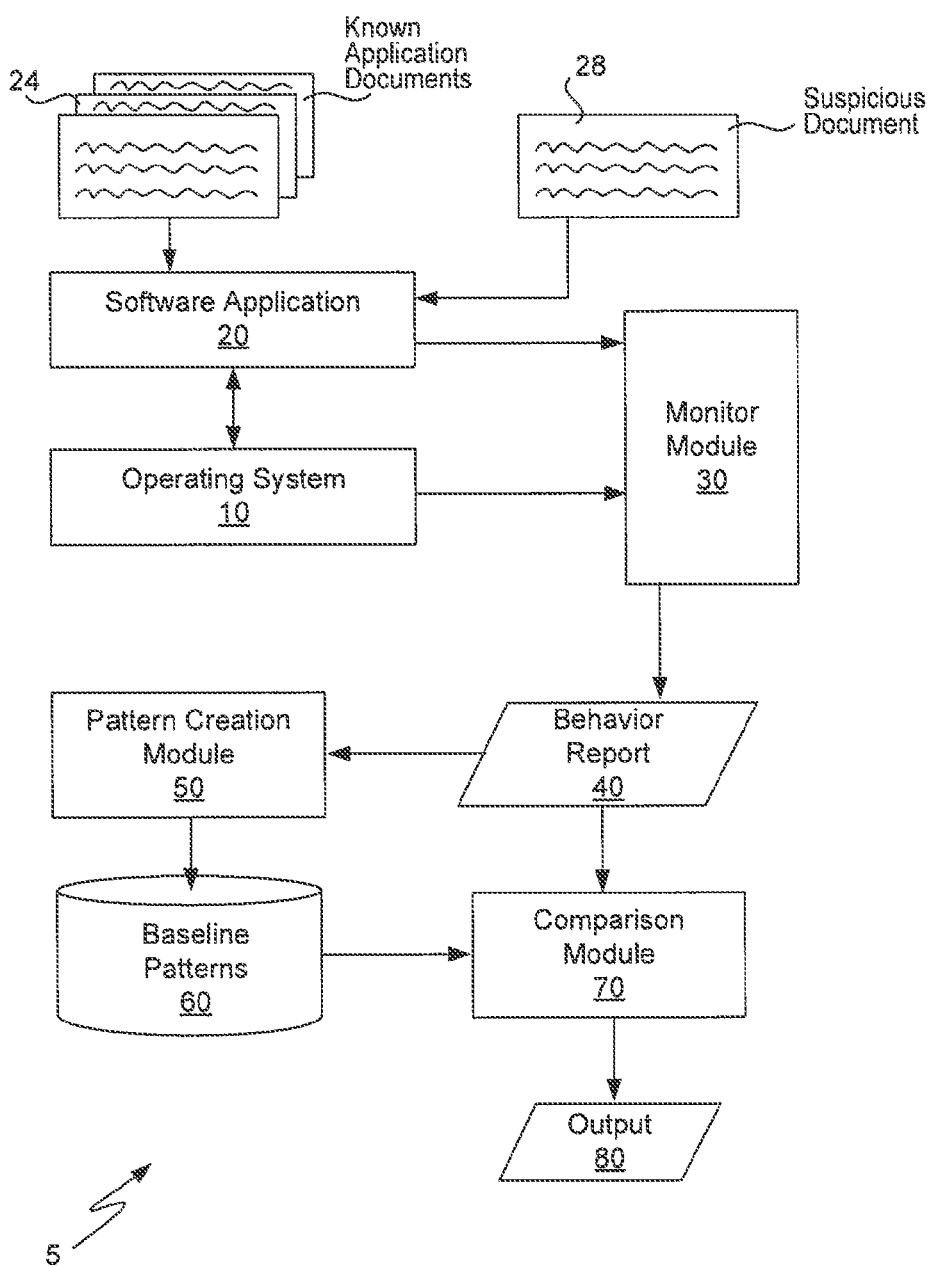
FIG. 1 is a block diagram of a computer system for implementing the present invention.

FIG. 1 is a block diagram of a computer system 5 for implementing the present invention. The present invention may be implemented upon a variety of computers (including computer system 900) such as laptops, desktops, server computers, backend computers, user computers, etc. Executing upon a computer is any suitable operating system 10 upon which is executing one or more software applications 20. This software application may be, for example, an application such as Microsoft Word, Adobe Acrobat or Adobe Reader, Excel, PowerPoint, Adobe Flash Player, Hangul, or Ichitaro (a Japanese word processor produced by JustSystems).

The computer system may be executing only a single software application at a time, or may be executing numerous of these software applications. Known application documents 24 refer to those so-called "document" files that are opened and possibly executed by the corresponding software applications listed above. For example, computer document types such as Flash files, PDF files, Word documents, Excel documents, PowerPoint documents, .RTF files, .HLP files, .HWP files and .JTD files are all considered document files.

During operation of the invention, a given document will be opened and possibly executed by its corresponding software application; for example, a Microsoft Word file ("example.doc"), will be opened by its corresponding software application, namely, Microsoft Word. These known application documents 24 include those known to be free of malware (including any document exploits) so that their opening and execution will only produce normal results that would be expected of a document that is free of malware. Application documents 24 also include those known to include a document exploit, so that their opening and execution will produce malicious results that would be expected of a document that contains malware.

By contrast, a suspicious document file 28 is one of the computer document types listed above but it is unknown as to whether this document includes any malware such as a document exploit. This suspicious document 28 will be opened by its corresponding software application 20. If there is a document exploit present in suspicious document 28 it is likely that the malicious code will take advantage of a vulnerability in the corresponding software application in order to engage in malicious behavior. For example, a PDF file might contain malicious code that attacks a vulnerability in Adobe Reader, the software application corresponding to the PDF file. It is also possible that a hybrid document exploit is present in suspicious document 28, in which case the malicious code will not take advantage of its corresponding software application, but instead will attack a vulnerability of a different software application. For example, a Flash object may be embedded within an Excel document, a Word document, a PDF document or a Web page. Instead of attacking a vulnerability in Excel, Word, Adobe Reader or Safari, the Flash object will attack a vulnerability in Flash Player and perform malicious activity in that fashion. Of course, other types of hybrid document exploits are possible in which a software object corresponding to a particular software application is embedded within a document corresponding to a different software application (e.g., many types of documents are able to be embedded within a Microsoft Word document as software objects, even though they are not DOC files).

Monitor module 30 is a software module or modules present and executing upon a computer system 5 and may include any number of hook modules or hooking code, as well as internal software drivers used to monitor the behavior of an application document (either document 24 or document 28) when it is opened by its software application. Module 30 need not be a discrete module that includes all of the computer code used to monitor and record the behavior of the application 20 and a document that it opens. For example, various hook modules and hooking code inserted in various places in the operating system may be considered as part of the monitor module, as well as any internal drivers that are executing within the operating system.

In one specific embodiment, module 30 includes a number of discrete monitor modules that are responsible for capturing behaviors during execution time and include a file system behaviors module, a registry behaviors module, and a network behaviors module. These three modules may be implemented as internal drivers in order to capture the specific behaviors. For example, the file system behaviors module captures these behaviors: add file, write file and delete file. The registry behaviors module captures these behaviors: add key, write key and delete key. The network behaviors module captures these behaviors: DNS query and HTTP request. Of course, other behaviors may be captured as well.

In addition to these specific modules, many process-related behaviors are monitored such as: create Mutex, create process, delete file, drop executable, execute dropped file, modify file, sleep, etc. And a variety of hooking methods may be used to capture process behaviors. Some of the API functions that are hooked include: CopyFileEx, MoveFileWithProgress, CreateFile, GetFileAttributes, CreateDirectory, RemoveDirectory, LoadLibrary, LoadImage, GetProcAddress, IsDebuggerPresent, CheckRemoteDebuggerPresent, Process32Next, CreateThread, InternetGetConnectedStateEx, InternetOpen, InternetOpenUrl, HttpOpenRequest, InternetConnect and FtpOpenFile. Of course, other functions may be hooked as well.

Behavior report 40 is a report listing details of the executing software application, the document it has opened, and the behavior produced by that document (whether a known document or a suspicious document). Examples of behavior reports are presented below. Pattern creation module 50 is a software module used to create a baseline pattern from a behavior report for a known document. Its operation is described below. Baseline pattern database 60 is a database of patterns produced from the behavior of known documents that have been opened. For example, database 60 may contain baseline patterns for each of the software applications such as Microsoft Word, Adobe Reader, etc. For example, a known normal baseline pattern and a known malicious baseline pattern may be stored in database 60 for Adobe Reader.

Comparison module 70 is a software module used to compare one of the baseline patterns (representing normal or malicious behavior of a document) with a behavior report concerning the opening and execution of a suspicious document. Based upon this comparison, the computer system may output 80 that a document exploit has been detected or not.

Flow Diagrams

Briefly, any number of known normal and known malicious sample documents are opened, executed and analyzed in the system to create behavior reports. Normal patterns are extracted from the behaviors of normal samples. Malicious patterns are extracted from the behaviors of malicious samples. Further, the malicious patterns may then be compared to the normal patterns to further refine the malicious patterns.

Figure 2:
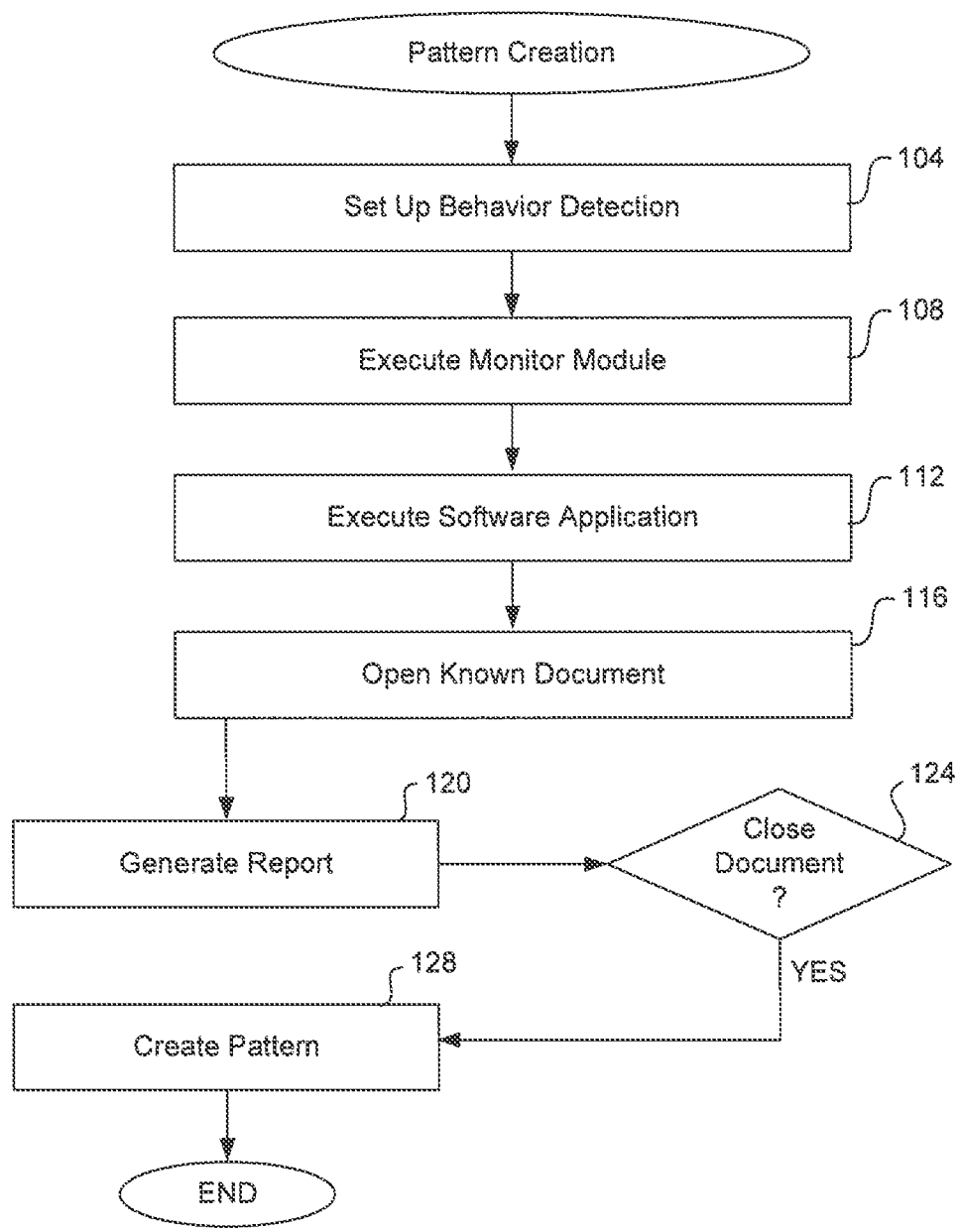
FIG. 2 is a flow diagram describing one embodiment by which a baseline pattern is created.

FIG. 2 is a flow diagram describing one embodiment by which a baseline pattern is created. In step 104 the behavior detection techniques are set up. Preferably, the behaviors that are monitored are registry behaviors, file system behaviors, process behaviors and network behaviors. Examples of behaviors are presented above and below.

These behaviors may be detected in different manners. In one specific embodiment, hook modules and hooking code are used to detect process behaviors, while internal software drivers are used to detect registry, file system and network behaviors. Internal drivers are processes internal to the operating system that may be written specifically to detect these behaviors.

Once these the detection techniques are in place, then in step 108 any such processes are executed (such as any internal drivers used) to begin monitoring the behavior of a document when opened. In step 112 the software application 20 under consideration begins execution. It is possible that other software applications are also executing at the same time, although preferably only a single software application is executing. In step 116 a known document corresponding to the executing software application is opened; this document is either known to be free of any malware including document exploits, or is known to include document exploits. Steps 108-116 may be executed manually by a user in the customary fashion (i.e., double-clicking on Microsoft Word and then double-clicking on a particular document), although it is preferable to use a command line to perform these actions. For example, first the Console application (or Terminal application) of the operating system is started and then a command line is used to launch these processes and to open a particular document.

In step 120 the monitoring software described above collects all behaviors of the document that has been opened and generates a report. These behaviors may include actions taken with respect to the opening of the document, and any other actions thereafter, including code that may be executed by virtue of the document being opened. Example of generated reports are shown in FIG. 4 (normal) and FIG. 5 (malicious).

When the computer system has recorded enough information concerning the behaviors of the opened document and its corresponding software application, then in step 124 the document is closed and the report is complete. The document may be closed after any suitable time; in one embodiment, a document is kept open for about 30 seconds while its behaviors are monitored and recorded. Of course, a document may be kept open for less time or for more time. Preferably, the document is also closed using a command line. Because the goal is to observe behavior and create a baseline pattern that is repeatable, preferably the user of the software application does not interact with the software application or the open document, and does not perform any operations with the document while open.

In another embodiment, it is possible to open and record the behaviors of more than a single document (either normal or malicious documents) corresponding to the executing software application. If so, the reports generated from each of these documents may be combined to create a single pattern. For example, since in the organization of a report the behaviors are organized by processes, the behaviors belonging to different sample documents will be categorized as children nodes of the parent processes of the report.

Once the document is closed then in step 128 a baseline pattern is created for the opened document and its executing software application using the report generated in step 120. The pattern is created by extracting useful information from the report. Useful information may be extracted and a pattern maybe created in different ways. In one particular embodiment, the pattern is a regular expression or a series of regular expressions used to match text and information strings in future behavior reports that are generated from suspicious documents 28. Examples of created patterns are shown in FIG. 6 (normal) and in FIG. 7 (malicious). Once created, the pattern is stored in database 60 for later comparison. In addition to regular expressions, keywords may also used as patterns, and are simply plain text.

In addition, as mentioned above, a pattern created from a known malicious document may be further refined by comparison with a pattern created from a known benign document. For example, it is possible that the regular expressions created for a malicious pattern may actually include a regular expression that matches with a benign behavior. Considering the regular expression 624 of FIG. 6 that matches with creation of a message box, this regular expression 624 may be removed from any malicious pattern because creation of a message box is relatively benign. In an alternative embodiment, benign regular expressions that are found within a malicious pattern may simply be assigned a weight value of 0.

Figure 3:
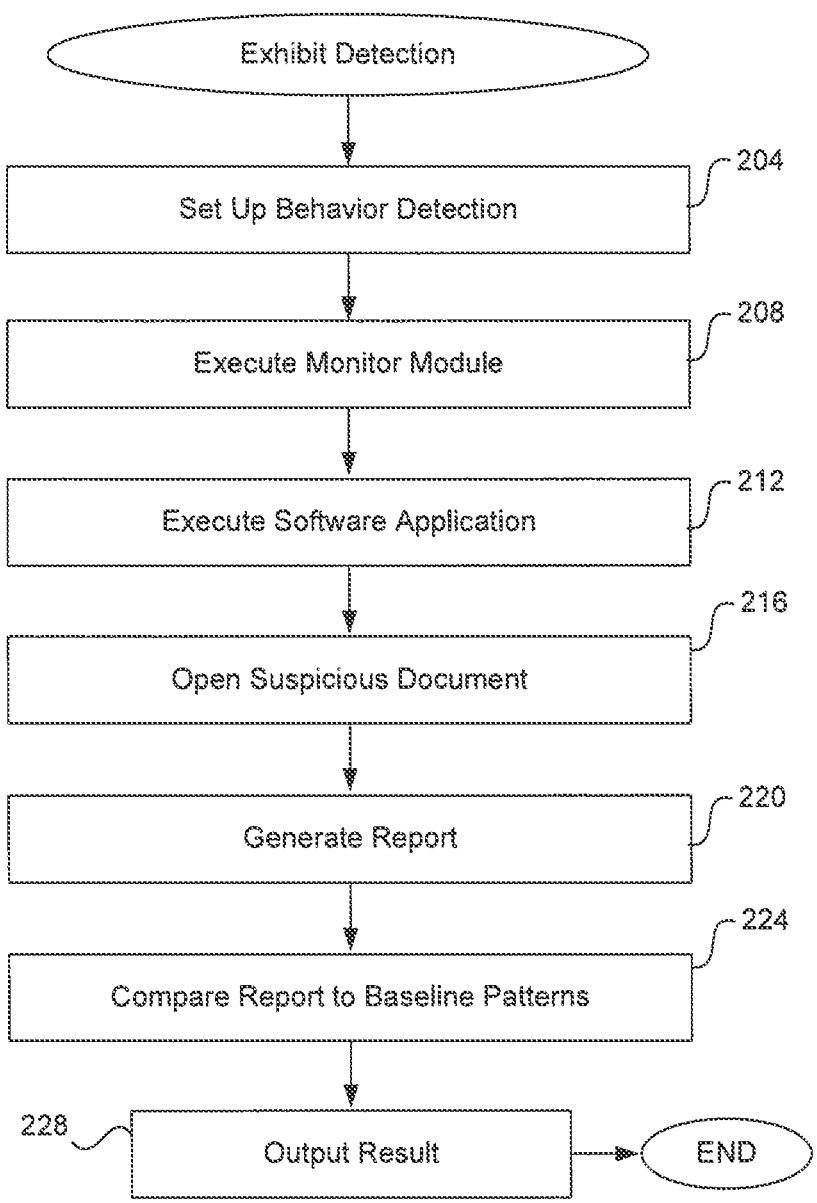
FIG. 3 is a flow diagram describing one embodiment by which a document exploit may be detected.

FIG. 3 is a flow diagram describing one embodiment by which a document exploit may be detected. Steps 204-212 may be performed in a similar fashion as steps 104-112, either as a session occurring later on the computer system or immediately subsequent to execution of the steps of FIG. 2. For example, once a baseline pattern or patterns have been created, a suspicious document 28 may be opened by the already executing software application 20 and it would not be necessary to perform steps 204-212 because steps 104-112 have just been performed. In another example, FIG. 3 is performed after the computer system has been shut down and restarted, in which case step 204-212 will be executed.

In step 216 a suspicious document 28 is opened by its corresponding software application 20, the same software application used previously to open the known document. For example, if a known normal pattern and a known malicious pattern have been created for the Excel application, then a suspicious Excel document 28 may be opened and compared. The suspicious document may be opened and monitored in a similar manner as described above for known documents. If the suspicious document does in fact contain a document exploit (or other type of malware) then malicious code within the suspicious document may take advantage of a vulnerability in the executing software application 20. If a hybrid document exploit is present, then the malicious code may take advantage of a vulnerability in a software application other than executing application 20.

In step 220 a report is generated for this suspicious document, detailing its processes started and details of behaviors for those processes. FIG. 5 shows an example of a report generated for execution of a suspicious document, which in this case, does contain malware.

In step 224 the report for the suspicious document is compared to a baseline pattern created in FIG. 2 for the same corresponding software application. In one embodiment, the suspicious report is compared to the malicious pattern first. If no exploit is detected, then the suspicious report is compared to the normal pattern.

Preferably, the comparison is handled automatically using any of a variety of computer algorithms. For example, a string search algorithm or a regular expression match algorithm may be used to compare the pattern to the report and to find similarities and differences. Or, both the baseline pattern and the suspicious report may be translated into the same internal format (such as Apilog format, an internal message format for logging behaviors) in order to compare the two more easily.

Weights are assigned to specific behaviors that match with specific text strings, regular expressions or rules of the baseline pattern that are indicative of malware. All of the weights are then summed to provide a final weight which is compared against a threshold number. A final weight greater than a threshold indicates that it is likely that the suspicious document includes a document exploit, while a final weight less than the threshold indicates the suspicious document is likely free of malware. In one particular embodiment, when each regular expression is matched (either a regular expression of FIG. 6 indicating a benign document or a regular expression of FIG. 7 indicating a malicious document), a weight value will be added to a running total. If the final weight total exceeds a threshold, then it is determined that malicious sample is detected.

For example, if a regular expression of FIG. 7 representing "drops an executable file" matches with a portion of the behavior report for a suspicious document then a weight of "2" is added to the running total. Other regular expressions of that pattern are also attempted to be matched. If the final total weight value exceeds 10 then a determination is made that the suspicious document is malicious. In one embodiment, if a regular expression in the normal pattern of FIG. 6 matches a portion of the behavior report for a suspicious document then a weight of 0 or a negative value may be added to the running total. In other embodiments, matching a regular expression in a normal pattern does not add any weight value to the running total, and only matching a regular expression in the malicious pattern adds a positive value to the running total.

In step 228 a result from this comparison is output, such as by generating an alert on the user computer, printing a result on paper, writing to a computer file, sending a message over a network, etc. The result indicates whether or not the suspicious document includes a document exploit or not.

Behavior Report Examples

As can be seen in FIG. 4, a report typically contains three parts. A first part 410 includes general information about this document and the generation of this report, a second part 420 (the call tree) provide information on processes running, and a third part 430 provides more detail on the behaviors of these processes. Of course, a report detailing the opening and execution of a particular document may take many forms; in this specific embodiment the form is that of a log file that provides very detailed information. The report of FIG. 4 has been greatly redacted in order to show exemplary information in a single drawing.

As shown in the first part 410 general information includes names of any antivirus software running, the name of the opened document, the type of document, the time when the document is opened and closed and any the decision made after the analysis process.

As shown in the second part 420, the call tree lists each of the various processes that have been started, each process identifier, the relevant file name, a start reason and a termination reason. The call tree may also describe which processes are subordinate to others. In this example, shown are first process 422 and a second process 424; information concerning a third process has been omitted for clarity.

As shown in the third part 430, shown are behaviors for each particular process organized by behaviors. For example, for the first process identified at 432, the behaviors listed are registry behaviors 434, file behaviors 436, file system behaviors 438, system behaviors 440, Mutex behaviors 442 and window behaviors 444. Many behaviors in each category have been redacted for clarity. In addition, behaviors for the second and third processes are not shown. This detail provides baseline information describing what are normal behaviors for a normal document free of malware.

FIG. 5 shows a behavior report for a document deemed to be malicious. As mentioned above, behaviors in this report are compared with a previously created malicious pattern, and weight values are assigned to matched regular expressions, leading to a conclusion of malicious if the final total is over a threshold.

A first part 510 includes general information about this document and the generation of this report, a second part 520 (the call tree) provide information on processes running, and a third part 530 provides more detail on the behaviors of these processes. In this specific embodiment, the form of the report is that of a log file that provides very detailed information. The report of FIG. 5 has been greatly redacted in order to show exemplary information in a single drawing.

As shown in the second part 520, the call tree lists each of the various processes that have been started, each process identifier, the relevant file name, a start reason and a termination reason. The call tree may also describe which processes are subordinate to others. In this example, shown are first, second, third, fourth and fifth processes.

As shown in the third part 530, shown are behaviors for each particular process organized by behaviors. For example, for the third process, the behaviors listed are registry behaviors 534, file behaviors 536, file system behaviors 538, system behaviors 540, Mutex behaviors 542, process behaviors 544, service behaviors 546, and network behaviors 548. Many behaviors in each category have been redacted for clarity. In addition, behaviors for the first, second, fourth and fifth processes are not shown. This detail provides information describing behaviors for a malicious document that contains malware such as a document exploit. Note that this reports also list behaviors under the "process," "service," and "network" categories which are not present in the normal behavior report of FIG. 4. In this example, the malicious pattern extracted from this report covered behaviors involving the registry, file system, processes, services and network. In most situations, the malware performed malicious operations in these areas.

Pattern Examples

FIG. 6 shows a normal pattern created from a normal behavior report. Shown are any number of regular expressions. These regular expressions were extracted from a number of normal behaviors and may be regarded as a baseline for comparison. In this example, expression 604 matches adding a registry; expression 608 matches modifying a registry; expression 612 matches adding a file; expression 616 matches modifying a file; expression 620 matches creating a Mutex; expression 624 matches creating a message box; expression 628 matches creating a mail slot; expression 632 matches creating an event; and expression 636 matches creating a process. As known in the art, a regular expression is a concise, accurate way to match text and information strings in a document.

FIG. 7 shows a malicious pattern created from a malicious behavior report. Shown are patterns organized as regular expressions. The patterns were extracted from a number of malicious behaviors. In this example, expression 704 matches dropping an executable; expression 708 matches dropping a file; expression 712 matches downloading an executable; expression 716 matches establishing a network connection and has two parts; expression 720 matches requesting a URL and has two parts; expression 724 matches a process residing in memory; expression 728 matches causing a document reader to crash; expression 732 matches using a heap spray technique to execute code; and expression 736 matches attempting to use a document exploit.

Computer System Embodiment

Figure 8A:
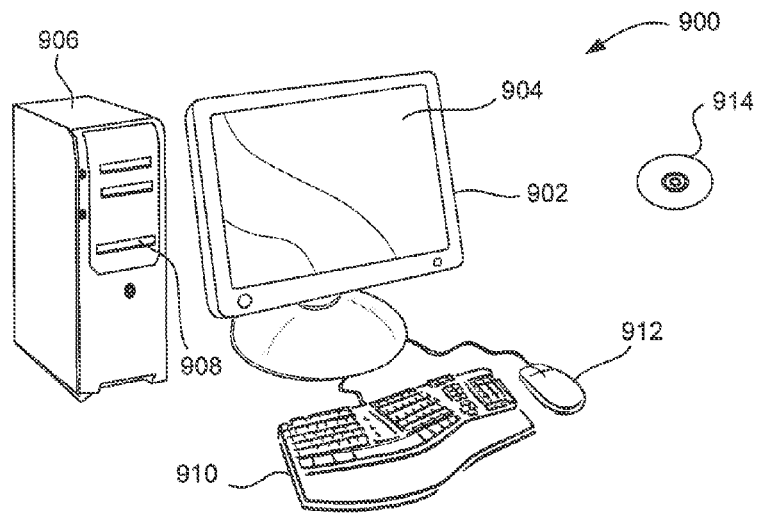
FIGS. 8A and 8B illustrate a computer system suitable for implementing embodiments of the present invention.
Figure 8B:
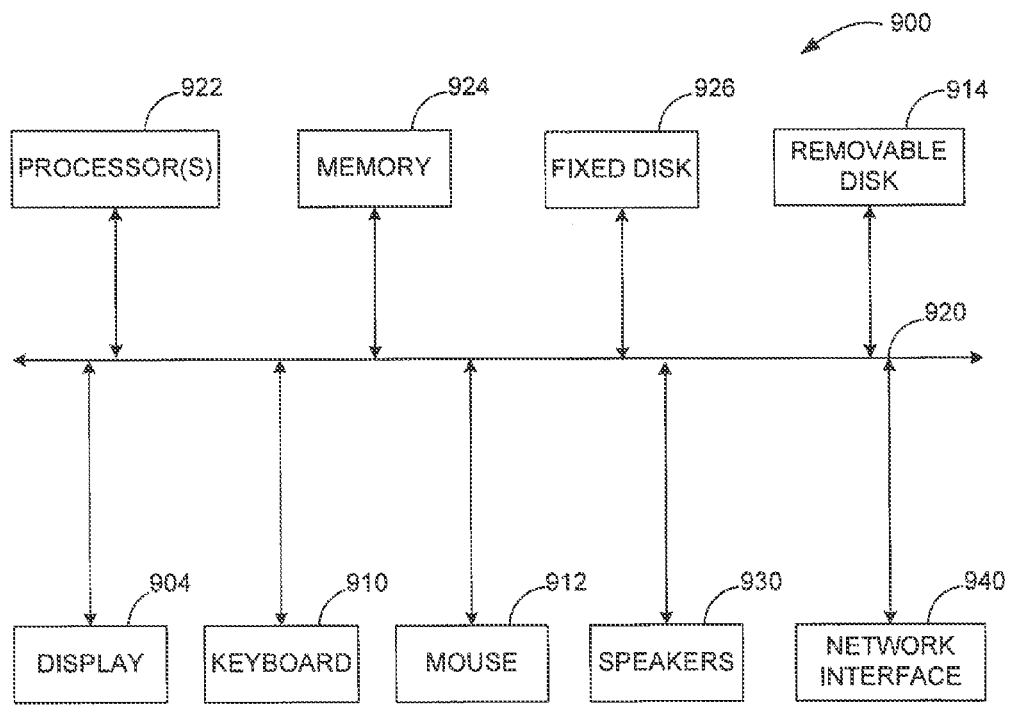

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of creating a pattern for document exploit detection, said method comprising:
   executing a software application in a computer;
   opening a document file using said executing software application, said document file known to include malware and being of a type corresponding to said software application;
   executing computer code of said document file in a software application different from said executing software application, said computer code exploiting a vulnerability in said different software application wherein said execution of said computer code of said document file in said different software application is caused by a software object embedded in said document file;
   recording behaviors in said computer caused by said computer code of said document file in a report file;
   creating a first pattern file from said report file, said first pattern file exhibiting said behaviors of said document file, which include one or more malicious behaviors;
   obtaining a second pattern file that indicates behaviors caused by execution of a different document file that is known to be normal and non-malicious; and
   comparing the first and second pattern files to help identify an expression of said first pattern file that matches with a benign behavior.

2. A method as recited in claim 1, said method further comprising:
   installing software hooks in an operating system of said computer and executing at least one internal driver in said computer in order to perform said recording.

3. A method as recited in claim 1, said method further comprising:
   closing said document file before any interaction by a user of said computer with said document file, wherein said report file does not include any behaviors caused by human interaction.

4. A method as recited in claim 1, said method comprising:
   removing from said first pattern file said expression that matches with said benign behavior.

5. A method as recited in claim 1, wherein said computer behaviors include registry behaviors, file system behaviors, network behaviors, and process behaviors.

6. A method as recited in claim 2, wherein:
   said recording of said computer behaviors uses said software hooks and said at least one internal driver.

7. A method as recited in claim 1, further comprising:
   executing a document file known to be normal and non-malicious;
   creating said second pattern file that indicates behaviors caused by said execution of said normal document file; and
   selecting one or more expressions in said first pattern file based on a comparison of said first pattern file and said second pattern file wherein said selected one or more expressions match expressions indicated in said second pattern file;
   modifying said first pattern file to indicate that said selected one or more expressions in said first pattern file are normal and non-malicious;
   opening a suspicious document file using a software application wherein it is unknown whether said suspicious document file is malicious;
   recording behaviors caused by execution of computer code of said suspicious document file;
   comparing said suspicious document file behaviors with behaviors indicated in said modified first pattern file;
   based on said comparison of said unknown document file behaviors with behaviors indicated in said modified first pattern file, determining whether said unknown document file is malicious; and
   displaying said determination.

8. A method as recited in claim 7 wherein:
   said modification of said first pattern file involves editing said first pattern file to remove said selected one or more expressions from said first pattern file.

9. A method as recited in claim 8 wherein said removed expression indicates a behavior caused by execution of said document file that is known to include malware, said removed expression involving one selected from the group consisting of adding a registry, modifying a registry, adding a file, modifying a file, establishing a network connection and downloading an executable.

10. A method of detecting a document exploit in a suspicious document file, said method comprising:
    executing a software application in a computer;
    opening said suspicious document file using said executing software application, said suspicious document file not including any malware;
    recording behaviors in said computer caused by computer code of said suspicious document file in a suspicious report file;
    receiving a baseline pattern file, said baseline pattern file including behaviors from a document file of a same type as said suspicious document file, wherein said document file of said same type is known to include malware;
    comparing behaviors of said suspicious report file to behaviors of said baseline pattern file;
    based on said comparing operation, matching a subset of said behaviors in said suspicious report file with behaviors in said baseline pattern file, said subset including at least two behaviors;
    assigning a separate weight to each matched behavior in said subset, each weight indicating a likelihood that each matched behavior involves malware; and
    outputting a result of said comparison indicating that said suspicious document file does not include a document exploit wherein said result is based at least in part on said weights assigned to said behaviors.

11. A method as recited in claim 10, said method further comprising:
    installing software hooks in an operating system of said computer and executing at least one internal driver in said computer in order to perform said recording.

12. A method as recited in claim 10, said method further comprising:
    closing said suspicious document file before any interaction by a user of said computer with said suspicious document file, wherein said suspicious report file does not include any behaviors caused by human interaction.

13. A method as recited in claim 10, wherein said suspicious document file is of a type corresponding to a type of said software application.

14. A method as recited in claim 10, wherein said computer behaviors include registry behaviors, file system behaviors, network behaviors, and process behaviors.

15. A method as recited in claim 11, wherein:
    said recording of said computer behaviors uses said software hooks and said at least one internal driver.

16. A method as recited in claim 10, further comprising:
    executing said computer code of said suspicious document file in a software application different from said executing software application wherein said execution of said computer code of said suspicious document file in said different software application is caused by a software object embedded in said suspicious document file.

17. A method as recited in claim 10, further comprising:
summing said weights of said behaviors that are found in said suspicious report file and said baseline pattern file; and
determining that said suspicious document file does not include a document exploit based at least in part on whether said summed weights exceeds a predetermined threshold.

18. A method as recited in claim 10 wherein each behavior of said baseline pattern is represented by one selected from the group consisting of a text string, a regular expression and a rule of said baseline pattern.

19. A method as recited in claim 10 wherein the comparing operation involves using at least one selected from the group consisting of a string search algorithm and a regular expression match algorithm to help identify matching behaviors in said suspicious report file and said baseline pattern.

20. A method of detecting a document exploit in a suspicious document file, said method comprising:
executing a software application in a computer;
opening said suspicious document file using said executing software application, said suspicious document file including said document exploit;
recording behaviors in said computer caused by computer code of said suspicious document file in a suspicious report file;
receiving a baseline pattern file, said baseline pattern file including behaviors from a document file of a same type as said suspicious document file, wherein said document file of said same type is known to include malware;
comparing behaviors of said suspicious report file to behaviors of said baseline pattern file;
based on said comparing operation, matching a subset of said behaviors in said suspicious report file with behaviors in said baseline pattern file, said subset including at least two behaviors;
assigning a separate weight to each matched behavior in said subset, each weight indicating a likelihood that each matched behavior involves malware; and
outputting a result of said comparison indicating that said suspicious document file includes said document exploit wherein said result is based at least in part on said weights assigned to said behaviors.

21. A method as recited in claim 20, said method further comprising:
installing software hooks in an operating system of said computer and executing at least one internal driver in said computer in order to perform said recording.

22. A method as recited in claim 20, said method further comprising:
closing said suspicious document file before any interaction by a user of said computer with said suspicious document file, wherein said suspicious report file does not include any behaviors caused by human interaction.

23. A method as recited in claim 20, wherein said suspicious document file is of a type corresponding to a type of said software application.

24. A method as recited in claim 20, wherein said computer behaviors include registry behaviors, file system behaviors, network behaviors, and process behaviors.

25. A method as recited in claim 21, wherein:
said recording of said computer behaviors uses said software hooks and said at least one internal driver.

26. A method as recited in claim 20, further comprising:
summing said weights of said behaviors that are found in both said suspicious report file and said baseline pattern file; and
determining that said suspicious document file includes said document exploit based at least in part on whether said summed weights exceed a predetermined threshold.

27. A method comprising:
executing a software application in a computer;
opening a document file using said executing software application, said document file known to include malware and being of a type corresponding to said software application;
recording behaviors in said computer caused by computer code of said document file in a report file;
creating a first pattern file from said report file, said first pattern file exhibiting said behaviors of said document file, which include one or more malicious behaviors;
executing a document file known to be normal and non-malicious;
creating a second pattern file that indicates behaviors caused by said execution of said known normal document file;
obtaining said second pattern file that indicates said behaviors caused by said execution of said known normal document file;
comparing said first and second pattern files to help identify an expression of said first pattern file that matches with a benign behavior;
selecting one or more expressions in said first pattern file based on said comparing operation; and
performing one selected from the group consisting of (1) removing said selected one or more expressions in said first pattern file without removing one or more other expressions in said first pattern file; and (2) assigning a value to said selected one or more expressions in said first pattern file that indicates that said selected one or more expressions are non-malicious wherein said assigned value is based on said comparing of said first pattern file and said second pattern file.

28. A method as recited in claim 1, further comprising:
executing a software application in a computer;
opening a document file using said executing software application, said document file known to include malware and being of a type corresponding to said software application;
recording behaviors in said computer caused by computer code of said document file in a report file;
creating a first pattern file from said report file, said first pattern file exhibiting said behaviors of said document file, which include one or more malicious behaviors;
obtaining a second pattern file that indicates behaviors caused by execution of a different document file that is known to be normal and non-malicious;
comparing the first and second pattern files to help identify an expression of said first pattern file that matches with a benign behavior;
opening a suspicious document file using an executing software application;
recording behaviors in a computer caused by computer code of said suspicious document file in a suspicious report file;
comparing behaviors of said suspicious report file to said malicious behaviors exhibited by said first pattern file;
assigning weights to behaviors that are indicative of malware and that are found in said suspicious report file and said first pattern file; and outputting a result indicating whether said suspicious document file is malicious wherein said result is based on said comparison of said behaviors of said suspicious report file to said malicious behaviors exhibited by said first pattern file and is further based on said assigned weights.

\* \* \* \* \*

UNITED STATES PATENT AND TRADEMARK OFFICE
CERTIFICATE OF CORRECTION

PATENT NO.         : 9,239,922 B1
APPLICATION NO.    : 13/794400
DATED              : January 19, 2016
INVENTOR(S)        : Zhu et al.

It is certified that error appears in the above-identified patent and that said Letters Patent is hereby corrected as shown below:

In the claims

1. In line 41 of claim 28 (column 14, line 41) change "A method as recited in claim 1, comprising:" to --A method comprising:--.

Signed and Sealed this
Ninth Day of August, 2016

Michelle K. Lee
*Director of the United States Patent and Trademark Office*